ALBERT COTSWORTH III
*INVENTOR.*
BY Francis W. Crotty
HIS ATTORNEY.

Sept. 9, 1958 A. COTSWORTH III 2,851,518

COLOR TELEVISION RECEIVER

Filed Dec. 31, 1954 2 Sheets-Sheet 2

ALBERT COTSWORTH III
*INVENTOR.*

BY Francis W. Crotty

HIS ATTORNEY.

United States Patent Office 2,851,518

Patented Sept. 9, 1958

2,851,518

COLOR TELEVISION RECEIVER

Albert Cotsworth III, Oak Park, Ill., assignor to Zenith Radio Corporation, a corporation of Delaware Application December 31, 1954, Serial No. 478,981

5 Claims. (Cl. 178—5.4)

This invention is directed to a new and improved color television receiver and more particularly to a color television receiver which provides for automatic control of the amplitude of signals representing the color content of the image to be reproduced.

In the color television system now approved as standard by the Federal Communications Commission, information relating to the brightness of an image is transmitted as a luminance signal which is generally equivalent to the video signal employed in conventional black-and-white transmission. Further information relating to the hue and saturation of the colors in the image is transmitted by means of color-difference signals modulated upon a subcarrier which is frequency-interleaved with the luminance signal. The usual sweep-synchronizing signals are transmitted as a part of the composite color signal and, in addition, separately identifiable color-synchronizing signals are also included as components of the composite color telecast. These color-synchronizing signal components comprise bursts of signal energy of a frequency equal to the color subcarrier frequency and having a predetermined phase relationship with respect to the color subcarrier; the color-synchronizing bursts are transmitted during horizontal retrace intervals.

Because the color information occupies only a limited portion of the frequency range shared with luminance signal, the luminance and carrier color signals may be unequally attenuated during transmission and/or demodulation and amplification at the receiver. Thus, the relative amplitudes of the luminance and carrier color signal components may vary during reception of a program or may change substantially when the receiver is tuned to a different transmission channel; as a result, the color values in the image may not be accurately reproduced. In order to avoid this effect, it is desirable to employ some means of automatically controlling or regulating the amplitude of the chrominance signals in relation to that of the luminance signal.

Ordinarily, automatic control of chrominance amplitude is based upon a comparison of the amplitude of the received color-synchronizing signal components with the amplitude of the horizontal sweep-synchronizing pulses included in the composite color signal. However, a circuit of this type is relatively complex and expensive. Consequently, it is desirable that a simpler yet still effective method and apparatus for automatic chroma control be provided. In addition, for reasons of economy, it is desirable that the automatic control of chrominance signal amplitude be effected in conjunction with a simplified circuit for segregating the chrominance and color-synchronizing signal components of the received composite color signal.

It is an object of the invention, therefore, to provide a new and improved color television receiver including means for automatically controlling the amplitude level of the chrominance signals in relation to the amplitude of the luminance signal.

It is another object of the invention to provide a new and improved color television receiver in which an automatic chroma control system is advantageously combined with means for separating the color picture signal and color-synchronizing signal components of a composite color signal.

It is a corollary object of the invention to provide a new and improved color television receiver including an automatic chroma control circuit which is simple and economical to manufacture and which requires a minimum of circuit components.

A color television receiver constructed in accordance with the invention and adapted to reproduce a color image from a composite color signal including periodically recurring color picture signal components and color-synchronizing signal components comprises a video signal translating channel including an electron-discharge device having a cathode for projecting a stream of electrons, an intensity-control electrode, a gating electrode system, and first and second output electrodes. This electron-discharge device is actuatable between a normal mode of operation in which the electron stream is collected by the first output electrode and a second mode of operation in which the electron stream is collected by the second output electrode. The receiver further includes means for applying the composite color signal to the intensity-control electrode of the electron-discharge device to modulate the electron stream therein. A color picture signal utilization circuit is coupled to the first output electrode. Means are included for applying a gating signal to the gating electrode system to actuate the electron-discharge device to its second mode of operation during operating intervals in which the color-synchronizing signal components occur in the signal. The second output electrode of the device is coupled to means for developing a control potential indicative of the average amplitude of the color-synchronizing signal components and for utilizing that control potential to control the amplitude of signals translated through the video channel to the aforementioned color picture signal utilization circuit.

The features of the invention which are believed to be novel are set forth with particularity in the appended claims. The organization and manner of operation of the invention, together with further objects and advantages thereof, may best be understood by reference to the following description taken in conjunction with the accompanying drawing, in which like elements are identified by like numerals in each of the figures, and in which:

Figure 1:
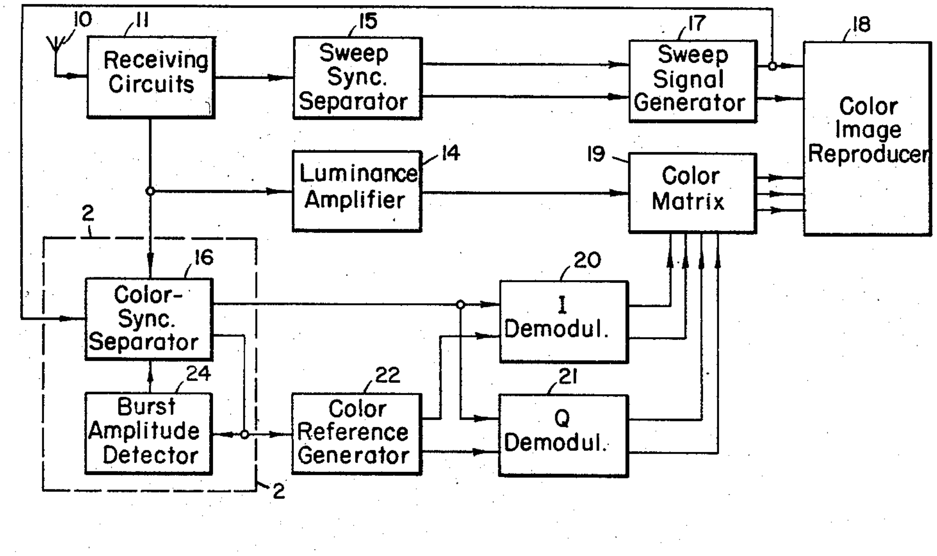
Figure 1 is a block diagram of a color television receiver embodying the invention.

The color television receiver illustrated in the block diagram of Figure 1 comprises an antenna 10 coupled to a receiving circuit unit 11; receiving circuits 11 may, for example, comprise a radio-frequency amplifier of one or more stages, a first detector, an intermediate-frequency amplification system of any desired number of stages, a second detector, and one or more stages of video-frequency amplification. Receiving circuits 11 are coupled to a sweep-synchronizing signal separator 15, to a color-synchronizing signal separator 16 and to a luminance amplifier 14. Sweep-synchronizing signal separator 15 is connected to a sweep-signal generator 17 which, in turn, is coupled to a color image reproducer 18. Reproducer 18 may comprise any of a wide variety of types of known color image reproducers; for example, the color image reproducer may consist of a cathode-ray tube including a tri-color target screen assembly and either a plurality of separate electron guns or a single electron gun employed in conjunction with a color-shift deflection system. The target assembly may be of the shadow-mask type with elemental luminescent target areas of either the dot or the line type. Further description of the image reproducer is deemed unnecessary, since several suitable constructions are well known in the art and the details of the image tube structure are of no consequence in regard to the present invention.

Luminance amplifier 14 is coupled to a color matrix 19, the output stages of the color matrix being connected to image reproducer 18. The horizontal sweep-frequency output stage of generator 17 is coupled to color-synchronizing signal separator 16 and one output stage of separator 16 is coupled to a pair of color demodulators 20 and 21. The color demodulators have been designated as I and Q demodulators in accordance with current standard terminology; their output stages are coupled to color matrix 19. A second output stage in separator 16 is coupled to a color reference generator 22 which, in turn, is individually connected to the two color demodulators 20 and 21.

As thus far described, the color television receiver illustrated in Figure 1 constitutes a conventional receiver modified to incorporate the teachings of the copending application of Charles Heuer, Serial No. 357,591, filed May 26, 1953, and assigned to the same assignee as the present invention. Accordingly, a brief description of the overall receiver operation is deemed adequate. A modulated-carrier color television signal is intercepted by antenna 10 and applied to receiving circuits 11 wherein it is suitably amplified and detected to develop a composite color signal comprising periodically recurring synchronizing-signal components interspersed with color picture signal components. The synchronizing-signal components include separately identifiable sweep-synchronizing components and color-synchronizing components, the latter consisting of bursts of a color sync signal of a frequency equal to the frequency of the color subcarrier signal and having a fixed phase relationship with respect to the color subcarrier signal. The composite color signal developed in receiving circuits 11 is supplied to luminance amplifier 14, which translates to color matrix 19 those portions of the composite color signal generally corresponding to the luminance signal. The composite color signal is also applied to separator 15, which segregates the sweep-synchronizing signal components and applies those components to generator 17 to control the frequency of locally-generated scanning signals which are supplied to image reproducer 18 in the usual fashion.

The composite color signal applied to color-synchronizing separator 16 is translated in alternation to the color demodulating system 20, 21 and to color reference generator 22; signals received from sweep-signal generator 17 control the operation of color-sync separator 16 so that only the synchronizing-signal components of the composite color signal are applied to color reference generator 22, whereas the color picture signal components are impressed on demodulators 20 and 21. In generator 22, the color sync signal or color bursts which form a part of the synchronizing-signal components are utilized to control the generation of a color carrier reference signal, and this reference signal is applied in predetermined phase relationship to demodulator 20 and in predetermined different phase reference to demodulator 21. In demodulator 20, that portion of the color picture signal components comprising the chrominance information is demodulated by means of the color reference signal supplied from generator 22 to develop a first color difference signal $E_I$; signal $E_I$ is applied to color matrix 19 in the form of two signals of opposite polarity. Similarly, in demodulator 21 the chrominance information is heterodyned with the color carrier reference signal to develop a second color difference signal $E_Q$ which is translated to color matrix 19 in the form of two opposite-polarity signals. In color matrix 19, the color difference signals are additively combined with the luminance signal $E_Y$ from amplifier 14 to develop three primary color signals $E_R$, $E_G$, and $E_B$ in the usual manner. As indicated above, except for color-synchronizing signal separator 16, the structure and operation of all of the circuits thus far described are entirely conventional and may be replaced by any other similar devices or circuits suitable for use in a color television receiver without departing from the scope of the invention.

Figure 2:
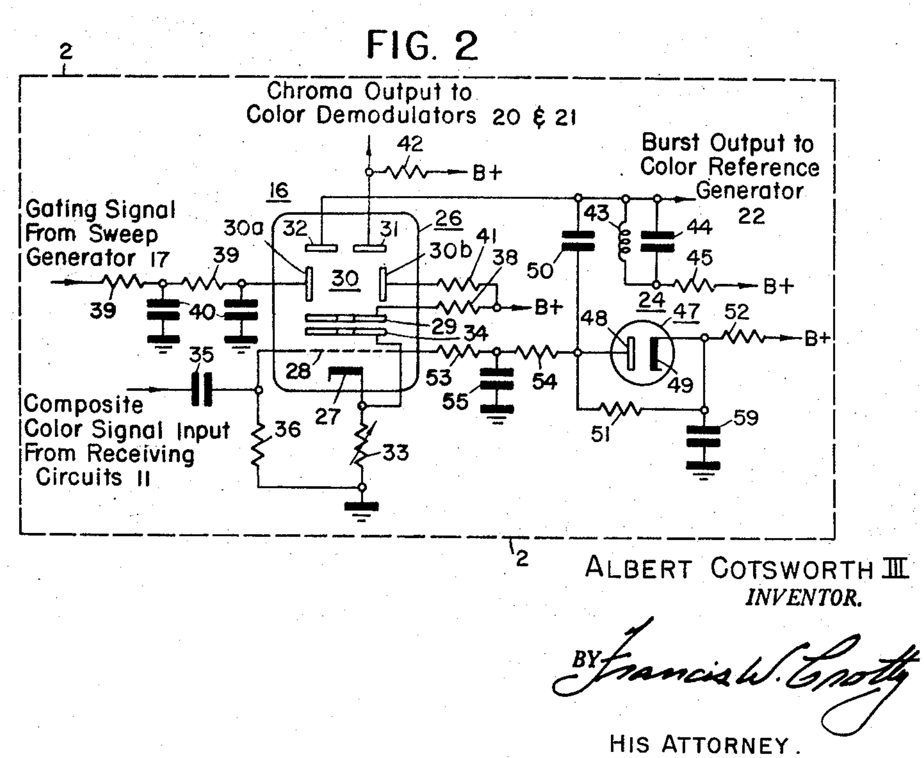
Figure 2 is a schematic diagram of a portion of the receiver of Figure 1 comprising an automatic chroma control system.

The second output stage of color-synchronizing signal separator 16 (that output stage coupled to color reference generator 22) is also coupled to a burst amplitude detector 24 and detector 24, in turn, is coupled back into separator 16. It is this portion of the receiver of Figure 1, enclosed in dash outline 2—2, which embodies the invention; the structure and operation of the invention may be best understood by reference to Figure 2, which provides a detailed schematic diagram of a specific circuit embodying the invention. As indicated in Figure 2, color-synchronizing signal separator 16 comprises an electron-discharge device 26 including a cathode 27, an intensity-control electrode 28, an accelerating electrode 29, a gating electrode system 30 comprising a pair of deflection-control electrodes 30a and 30b, and a pair of output electrodes or anodes 31 and 32. Tube 26 may also include a focusing electrode 34 between grid 28 and accelerator 29. Cathode 27 is connected to a plane of reference potential, here represented as ground, through a variable resistor 33. Intensity-control electrode 28 is coupled to receiving circuits 11 (Figure 1) through a coupling capacitor 35 and a grid-leak resistor 36, resistor 36 being connected between control electrode 28 and ground. Focus electrode 34 may be connected to cathode 27. Accelerating electrode 29 is connected to a source of unidirectional positive operating potential B+ through a resistor 38. Deflection-control electrode 30a is coupled to a gating signal source by means of a phasing network comprising a pair of series-connected resistors 39 and two capacitors 40 connected between resistors 39 and ground; for the embodiment illustrated, the gating signal is supplied from sweep-signal generator 17 of Figure 1. Deflector 30b is connected through a resistor 41 to operating potential source B+. It should be understood that suitable bypass capacitors may be connected between deflector 30b and ground and between accelerator 29 and ground to avoid impressing gating-frequency or other undesirable signals upon the B+ supply.

Anode 31 of tube 26 is connected to potential source B+ through an output circuit comprising a load resistor 42; resistor 42 is also coupled to color demodulators 20 and 21 of Figure 1. Anode 32 is coupled to color reference generator 22 of Figure 1 by means of a tuned output circuit comprising an inductance 43 connected in parallel with a capacitor 44, the output circuit being connected to operating potential source B+ through a resistor 45.

The burst amplitude detector 24 comprises a diode 47 having an anode 48 and a cathode 49. Anode 48 is coupled to output electrode 32 of tube 26 by means of a capacitor 50; the anode is also connected to cathode 49 through a resistor 51. Cathode 49 is connected to D. C. source B+ by means of a delay bias resistor 52 and to ground by a by-pass condenser 59. A feedback connection between detector 24 and separator 16 is provided by a filter circuit comprising two series-connected resistors 53 and 54 interconnecting anode 48 and control electrode 28, the filter further including a capacitor 55 coupled between the junction of resistors 53—54 and ground.

When the apparatus of Figure 2 is placed in operation, color-synchronizing signal separator 16 operates in much the same manner as the burst gate described and claimed in the aforementioned copending application of Charles H. Heuer. A stream of electrons is projected from cathode 27 toward anodes 31 and 32 in device 26. The electron stream is modulated in intensity by the composite color signal applied to control electrode 28 from receiving circuits 11 and is focused and accelerated as it passes through the apertures in electrodes 34 and 29. In the absence of any control signal on deflector 30*a*, the biasing potential applied to the deflection control system from source B+ directs the electron beam to impinge upon anode 31. Consequently, the modulated beam energizes the output circuit comprising resistor 42 to develop a color picture signal supplied to the utilization circuit comprising demodulators 20 and 21. Deflector 30*a* is supplied with a gating signal from sweep generator 17 in synchronism with the synchronizing-signal components of the composite color signal. The gating signal, which for the illustrated embodiment comprises positive-polarity pulses, deflects the electron beam to impinge exclusively upon anode 32 during operating intervals in which the synchronizing-signal components occur in the composite color signal. Thus, the gating signal actuates electron-discharge device 26 from a normal mode of operation in which the electron beam is collected by output electrode 31 to a second mode of operation in which the electron stream is collected by the second output electrode, anode 32. In the second mode of operation, the output circuit 43—45 coupled to anode 32 is energized and a signal corresponding to the color burst is supplied to color reference generator 22 (Figure 1).

It is preferred that the pulses comprising the gating signal be equal in duration to and coincident in time with the color-synchronizing signal components so that only the color-synchronizing signal is applied to the color reference generator and the color-synchronizing signal bursts are not translated to the color picture signal utilization circuits. In addition, the gating signal should not be of greater duration than the combined horizontal and color-synchronizing signal components of the composite color signal. The horizontal retrace scanning signals normally developed in sweep-signal generator 17 may be readily employed for gating; the phase relationship of these retrace signals with respect to the color-synchronizing components is adjusted by means of phasing network 39, 40 to obtain the requisite time coincidence.

The color-synchronizing signal components are, of course, applied to detector 24 when device 26 is in its second mode of operation. Diode 47 is normally biased to be non-conductive when no signal is applied to the anode. The circuit is constructed to operate as a conventional peak detector. Capacitor 50 must remain charged during periods of non-conduction of diode 47; consequently, resistors 51, 52 and capacitor 50 should be selected to provide a relatively long time constant. The impedances of filter circuit 53—55 are also selected so that the filter has a relatively long time constant. Consequently, the detector circuit develops a control potential across capacitor 55 which is indicative of the average amplitude of the color bursts. This control potential is applied to intensity-control electrode 28 to vary the operating bias potential of the control electrode and thus to provide automatic control of the amplitude of the signals translated through tube 26 to color demodulators 20 and 21. Accordingly, any increase in amplitude of the color bursts causes a proportionate decrease in the operating potential applied to control electrode 28 through resistors 53, 54 and the amplitude of the chrominance signals translated by demodulators 20, 21 is made directly dependent upon the amplitude of the color-synchronizing signal components. The current through resistor 51 provides a delay potential which prevents conduction in diode 47 until the output level of the color burst signal reaches a predetermined threshold level; in this respect, the circuit functions much like the conventional automatic gain control circuits used in many television receivers.

Because the color-synchronizing signal components are of the same frequency as the color subcarrier, they should, under normal conditions, be subjected to the same relative attenuation, with respect to the luminance signal, during transmission as the carrier color signal components of the color picture signal. Consequently, the automatic chroma control circuit illustrated in Figure 2 provides a reasonably accurate means of maintaining the carrier color signal amplitude at a constant level with respect to the amplitude of the luminance signal included in the composite color signal. For proper operation, the receiver must include the usual automatic gain control system to maintain a constant picture carrier level at the second detector in receiving circuits 11. If this condition is fulfilled, the embodiment of the invention illustrated in Figures 1 and 2 can maintain the desired constant relative amplitude between the luminance and chrominance signal channels and thus avoid disturbances in image reproduction with changes in tuning of the receiver and/or with changes in efficiency of transmission. The circuit illustrated in Figure 2 is exceedingly simple and requires only a minimum of circuit components to perform the automatic control functions. In addition, it effectively combines automatic control of chrominance amplitude with effective separation of the color-synchronizing and color picture components of the composite color signal.

Figure 3:
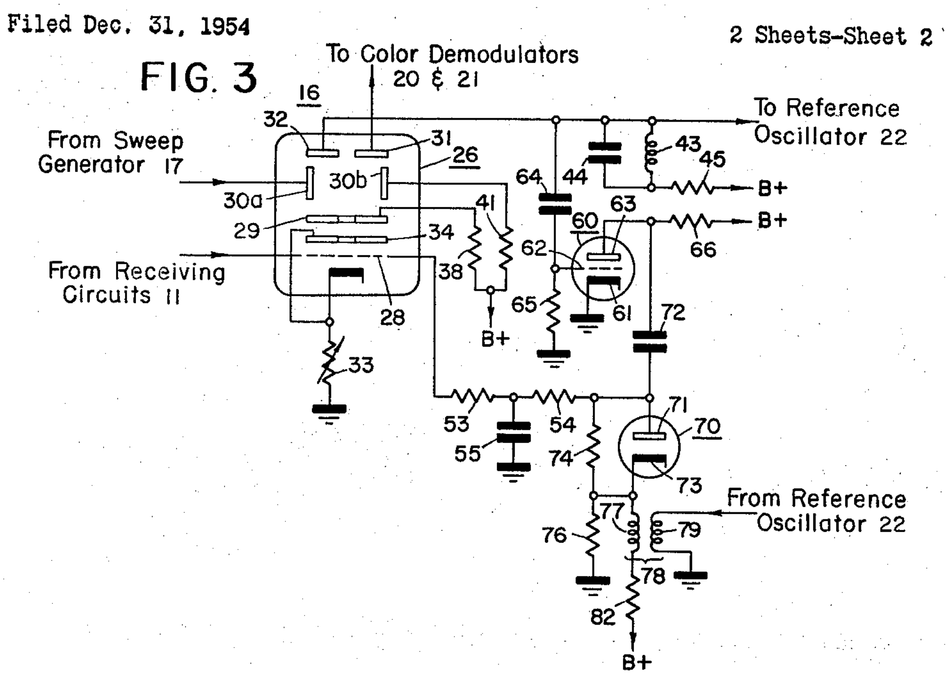
Figure 3 is a schematic diagram of another embodiment of the apparatus illustrated in Figure 2.

Figure 3 illustrates another specific circuit effectively embodying the advantages of the invention. The color-synchronizing signal separator 16 included in this embodiment may be essentially identical with that of Figure 2 and may comprise an electron-discharge device 26 coupled to receiving circuit 11, sweep generator 17, and color demodulators 20 and 21 in the same manner as in the previously described apparatus. In addition, the connection between second output electrode 32 of tube 26 and reference oscillator 22 may be the same as in the apparatus of Figure 2.

In this embodiment, second anode 32 is coupled to the control electrode 62 of an electron-discharge device 60 by means of a coupling capacitor 64 and a grid leak resistor 65. Tube 60, which includes a cathode 61 and an anode 63 in addition to control electrode 62, serves as a buffer amplifier. Cathode 61 may be grounded and anode 63 may be coupled to D. C. source B+ by means of a suitable load resistor 66. It should be understood that any suitable form of discharge device and associated circuitry may be employed for the buffer amplifier.

Amplifier 60 is coupled to the anode 71 of a diode 70 by means of a capacitor 72; anode 71 is also connected to the cathode 73 of the diode by means of a resistor 74 and is connected to control electrode 28 of the tube 26 by a filter comprising two resistors 53 and 54 and a capacitor 55 which may be substantially identical to the similarly-numbered filter elements in Figure 2. Cathode 73 is connected to ground through a resistor 76 and is connected through an inductance 77 and a resistor 82 to operating potential source B+. Inductance 77 forms one winding of a transformer 78; the other winding 79 of the transformer is coupled to reference oscillator 22 (Figure 1).

The apparatus of Figure 3 is in all respects equivalent to that of Figure 2 except that a buffer amplifier is interposed between the source of color burst signals and the detector; in addition the automatic chroma control circuit is constructed as a synchronous detector instead of the peak detector described in the earlier embodiment. This particular structure is advantageous in that it provides somewhat better noise immunity than the apparatus of Figure 2, since any noise which does not occur in time coincidence with the peaks of the color burst signals has no effect upon operation of the automatic chroma control circuit. The buffer amplifier comprising tube 60 precludes translation of the signals applied to detector diode 70 from reference oscillator 22 back through the output circuit of tube 26 to the reference oscillator, thus preventing the oscillator from locking in on its own signal.

Figure 4:
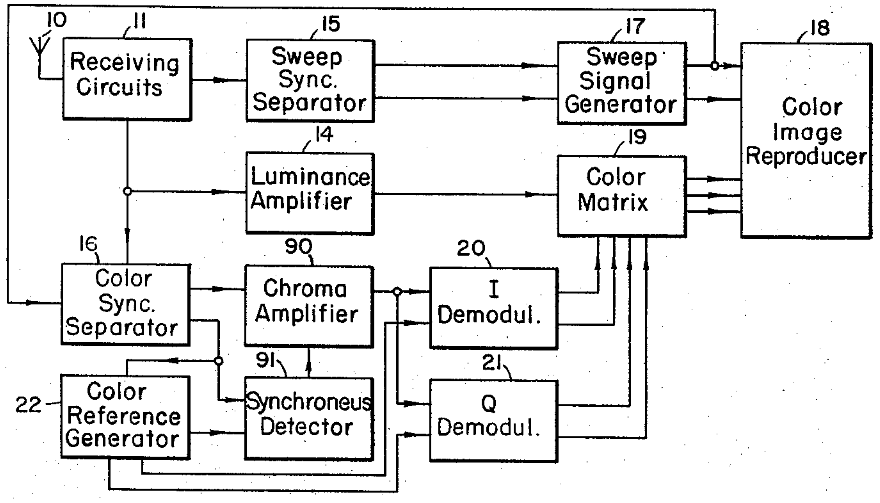
Figure 4 is a block diagram of a color television receiver constructed in accordance with a second embodiment of the invention.

Figure 4 illustrates another embodiment of the invention in block diagram form. The color television receiver shown therein is in most respects identical with that of Figure 1 and comprises an antenna 10 coupled to receiving circuits 11 which, in turn, are connected to a sweep-synchronizing signal separator 15, a luminance amplifier 14, and a color-synchronizing signal separator 16. The sweep-synchronizing separator is again coupled to a sweep-signal generator 17 which is connected to the color image reproducer 18 and to color-sync separator 16. The receiver further includes two color demodulators 20 and 21 which are coupled to a color reference generator 22 and to a color matrix 19 as in the earlier embodiment, color matrix 19 being coupled to the output of luminance amplifier 14. Suitable connections are provided between the color matrix and image reproducer 18.

In the embodiment, the first output stage of color-synchronizing signal separator 16 is coupled to a chroma amplifier 90 which, in turn, is connected to the two color demodulators 20 and 21. The second output stage of separator 16 is coupled to a synchronous detector 91 and to color reference generator 22 as in the circuit of Figure 3. In this embodiment, however, the output stage of the synchronous detector is not coupled back to separator 16; rather, the synchronous detector is coupled to chroma amplifier 90.

Operationally, the embodiment of Figure 4 is generally equivalent to that of Figure 1. In this embodiment, however, the control potential developed by synchronous detector 91 is not employed directly to modify the gain characteristics of the color-synchronizing signal separator. Rather, the control potential is employed to control the gain of amplifier 90 and thus to control the amplitude of signals translated through the video signal channel comprising separator 16, amplifier 90, and demodulators 20 and 21. By employing the control potential to modify the gain characteristics of a subsequent stage in the video channel, somewhat greater sensitivity may be achieved; the same effect may of course be obtained using the peak detector apparatus described in connection with Figure 2.

In each of the embodiments of the invention, the amplitude of the color picture signal applied to the utilization circuit comprising demodulators 20 and 21 is controlled in accordance with the amplitude of the color-synchronizing signal, thus providing automatic control of the chrominance content of the reproduced image. The control circuitry is extremely simple and inexpensive in construction and avoids any necessity for comparison with the sweep-synchronizing signals. In addition, the described embodiments each effectively combine the automatic chroma control with separation of the color picture signal and color-synchronizing components of the composite color signal.

While particular embodiments of the present invention have been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

I claim:

1. A color television receiver adapted to reproduce a color image from a composite color signal including periodically recurring color picture signal components and color-synchronizing signal components comprising: a video signal-translating channel including an electron-discharge device comprising a cathode for projecting a stream of electrons, an intensity-control electrode, a gating electrode system, and first and second output electrodes, said electron-discharge device being actuatable between a normal mode of operation in which said electron stream is collected by said first output electrode and a second mode of operation in which said electron stream is collected by said second output electrode; means for applying said composite color signal to said intensity-control electrode to modulate said electron stream; a color picture signal utilization circuit coupled to said first output electrode; means for applying a gating signal to said gating electrode system to actuate said electron-discharge device to said second mode of operation during operating intervals in which said color-synchronizing signal components occur in said composite color signal; and means, coupled to said second output electrode and to said video signal-translating channel, for developing a control potential indicative of the average amplitude of said color-synchronizing signal components and for utilizing said control potential to control the amplitude of signals translated through said video channel to said color picture signal utilization circuit.

2. A color television receiver adapted to reproduce a color image from a composite color signal including periodically recurring color picture signal components and color-synchronizing signal components comprising: an electron-discharge device including a cathode for projecting a stream of electrons, an intensity-control electrode, a gating electrode system, and first and second output electrodes, said electron-discharge device being actuatable between a normal mode of operation in which said electron stream is collected by said first output electrode and a second mode of operation in which said electron stream is collected by said second output electrode; means for applying said composite color signal to said intensity-control electrode to modulate said electron stream; a color picture signal utilization circuit coupled to said first output electrode; means for applying a gating signal to said gating electrode system to actuate said electron-discharge device to said second mode of operation during operating intervals in which said color-synchronizing signal components occur in said composite color signal; and means, coupled to said second output electrode and to said intensity-control electrode, for developing a control potential indicative of the average amplitude of said color-synchronizing signal components and for applying said control potential to said intensity-control electrode to control the amplitude of signals supplied to said color picture signal utilization circuit.

3. A color television receiver adapted to reproduce a color image from a composite color signal including periodically recurring color picture signal components and color-synchronizing signal components comprising: a video signal-translating channel including an electron-discharge device comprising a cathode for projecting a stream of electrons, an intensity-control electrode, a gating electrode system, and first and second output electrodes, said electron-discharge device being actuatable between a normal mode of operation in which said electron stream is collected by said first output electrode and a second mode of operation in which said electron stream is collected by said second output electrode; means for applying said composite color signal to said intensity-control electrode to modulate said electron stream; a color picture signal utilization circuit coupled to said first output electrode; means for applying a gating signal to said gating electrode system to actuate said electron-discharge device to said second mode of operation during operating intervals in which said color-synchronizing signal components occur in said composite color signal; a color reference generator for generating a color reference signal having a predetermined phase and frequency relationship to said color-synchronizing components; means coupled to said second output electrode and to said color reference generator for applying said color-synchronizing components to said generator to control the phase and frequency of said color reference signal; and means, coupled to said second output electrode and to said video signal-translating channel, for developing a control potential indicative of the average amplitude of said color-synchronizing signal components and for utilizing said control potential to control the amplitude of signals translated through said video channel to said color picture signal utilization circuit.

4. A color television receiver adapted to reproduce a color image from a composite color signal including periodically recurring color picture signal components and color-synchronizing signal components comprising: a video signal-translating channel including an electron-discharge device comprising a cathode for projecting a stream of electrons, an intensity-control electrode, a gating electrode system, and first and second output electrodes, said electron-discharge device being actuatable between a normal mode of operation in which said electron stream is collected by said first output electrode and a second mode of operation in which said electron stream is collected by said second output electrode; means for applying said composite color signal to said intensity-control electrode to modulate said electron stream; a color picture signal utilization circuit coupled to said first output electrode; means for applying a gating signal to said gating electrode system to actuate said electron-discharge device to said second mode of operation during operating intervals in which said color-synchronizing signal components occur in said composite color signal; a color reference generator for generating a color reference signal having a predetermined phase and frequency relationship to said color-synchronizing components; means coupled to said second output electrode and to said color reference generator for applying said color-synchronizing components to said generator to control the phase and frequency of said color reference signal; a synchronous detector, coupled to said second output electrode and to said color reference generator, for developing a control potential indicative of the average amplitude of said color-synchronizing signal components; and filter means coupling said synchronous detector to said video signal-translating channel for utilizing said control potential to control the amplitude of signals translated through said video channel to said color picture signal utilization circuit.

5. A color television receiver adapted to reproduce a color image from a composite color signal including periodically recurring color picture signal components and color-synchronizing signal components comprising: a beam-deflection electron-discharge device comprising a cathode for projecting a stream of electrons, an intensity-control electrode, a pair of deflection electrodes, and first and second output electrodes, said electron-discharge device being actuatable between a normal mode of operation in which said electron stream is collected by said first output electrode and a second mode of operation in which said election stream is collected by said second output electrode; means for applying said composite color signal to said intensity-control electrode to modulate said electron stream; a color picture signal utilization circuit coupled to said first output electrode; means for applying a gating signal to said deflection electrodes to actuate said electron-discharge device to said second mode of operation during operating intervals in which said color-synchronizing signal components occur in said composite color signal; and detector means, coupled to said second output electrode and to said intensity-control electrode, for developing a control potential indicative of the average amplitude of said color-synchronizing signal components and for applying said control potential to said intensity-control electrode to control the amplitude of signals supplied to said color picture signal utilization circuit.

References Cited in the file of this patent

UNITED STATES PATENTS

| | | |
|---|---|---|
| 2,680,147 | Rhodes | June 1, 1954 |
| 2,681,379 | Schroeder | June 15, 1954 |
| 2,684,404 | Adler | July 20, 1954 |
| 2,736,765 | Lohman | Feb. 28, 1956 |

OTHER REFERENCES

Color TV, Rider Pub., March 1956, pages 141–142.

Introduction to Color Television, Admiral Corp., February 1954, pages 17 to 27.